United States Patent [19]

DeBell et al.

[11] 4,155,033

[45] May 15, 1979

[54] SYNCHRONOUS CAPSTAN DRIVE SYSTEM

[75] Inventors: Lawrence R. DeBell, Bethany; David D. Price, Jr., Oklahoma City, both of Okla.

[73] Assignee: Triple I, Incorporated, Oklahoma City, Okla.

[21] Appl. No.: 807,059

[22] Filed: Jun. 16, 1977

[51] Int. Cl.² .............................................. H02P 3/00
[52] U.S. Cl. ................................. 318/341; 318/314; 318/342; 318/328
[58] Field of Search ............... 318/314, 341, 342, 599, 318/328, 329

[56] References Cited

U.S. PATENT DOCUMENTS

| | | | |
|---|---|---|---|
| 3,596,162 | 7/1971 | Takayama | 318/341 |
| 3,753,067 | 8/1973 | Milligan | 318/314 |
| 3,843,914 | 10/1974 | Carlson et al. | 318/341 |
| 3,912,994 | 10/1975 | Stovall | 318/341 |

*Primary Examiner*—Gene Z. Rubinson
*Assistant Examiner*—M. K. Mutter
*Attorney, Agent, or Firm*—Laney, Dougherty, Hessin & Beavers

[57] ABSTRACT

A drive system for tape transducer capstan drive control for synchronously controlling capstan drive over a wide speed range, the system being a phase locked loop which encompasses the motor, all drive components, and the capstan. The capstan drive to a tape record receives rotation from a capstan drive motor which also provides a rotational sense output. A control circuit receives the sense output as well as a selected reference frequency signal and processes the signals in accordance with selected binary control input thereby to generate the requisite drive voltage for energization of the capstan drive motor.

17 Claims, 5 Drawing Figures

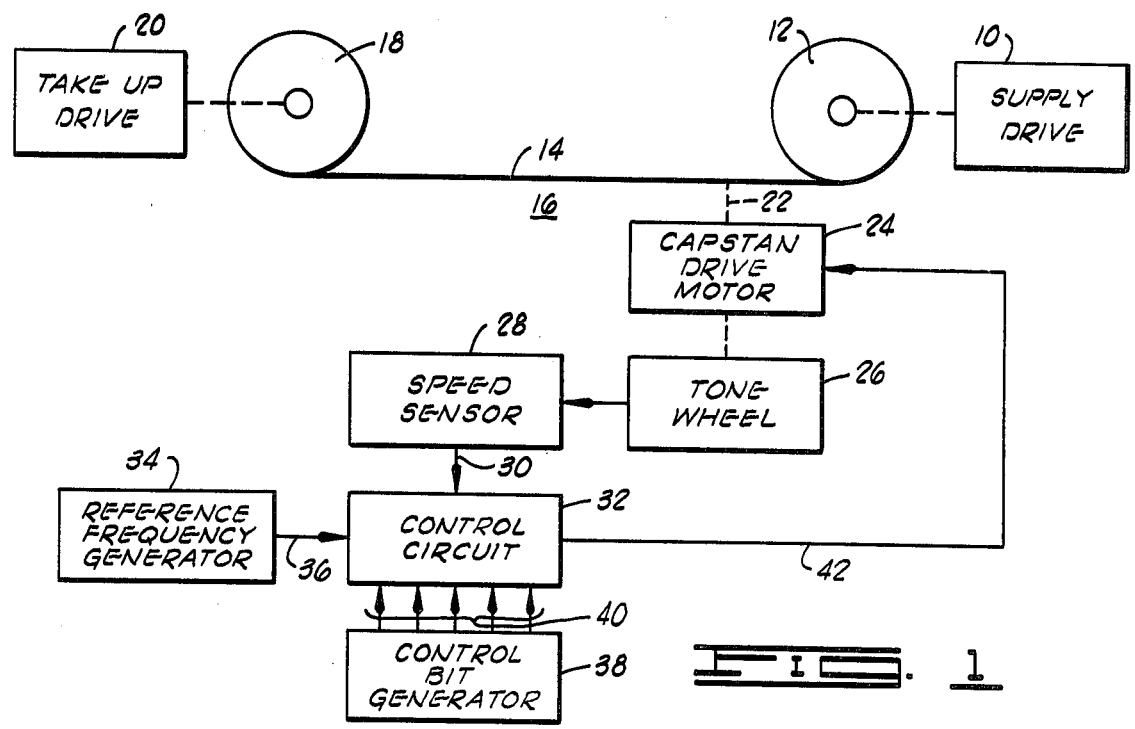
FIG. 1
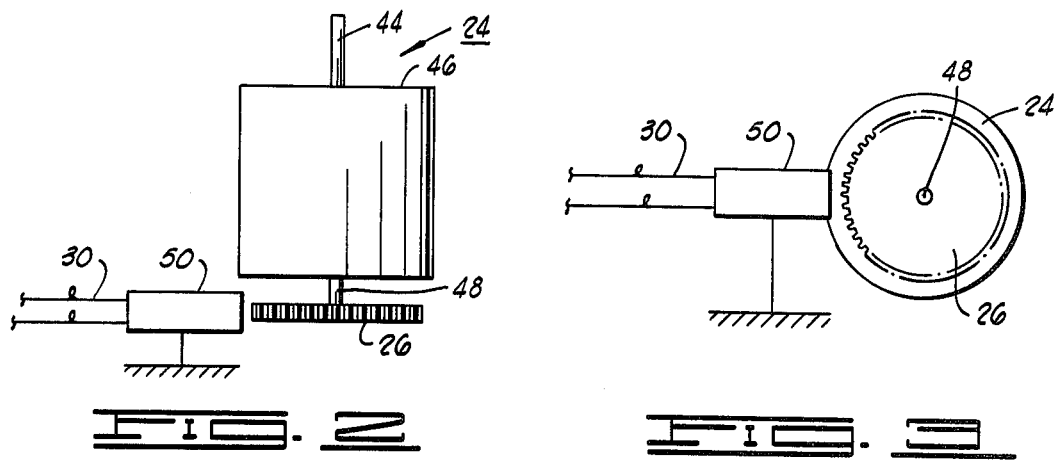
FIG. 2
FIG. 3
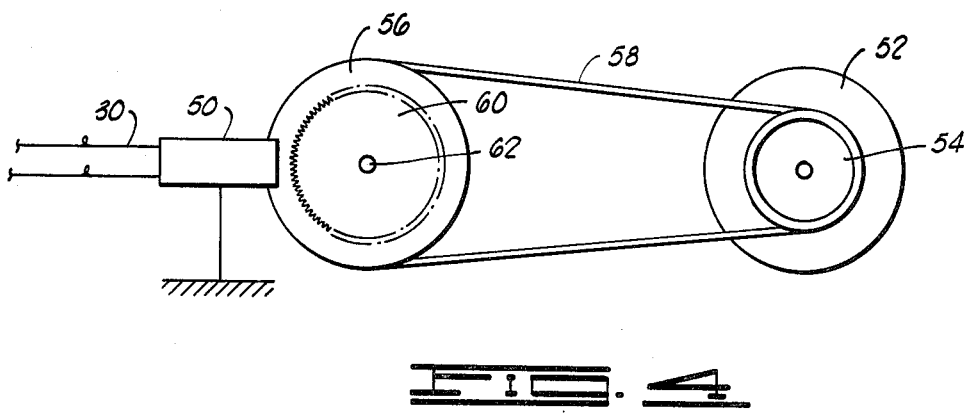
FIG. 4

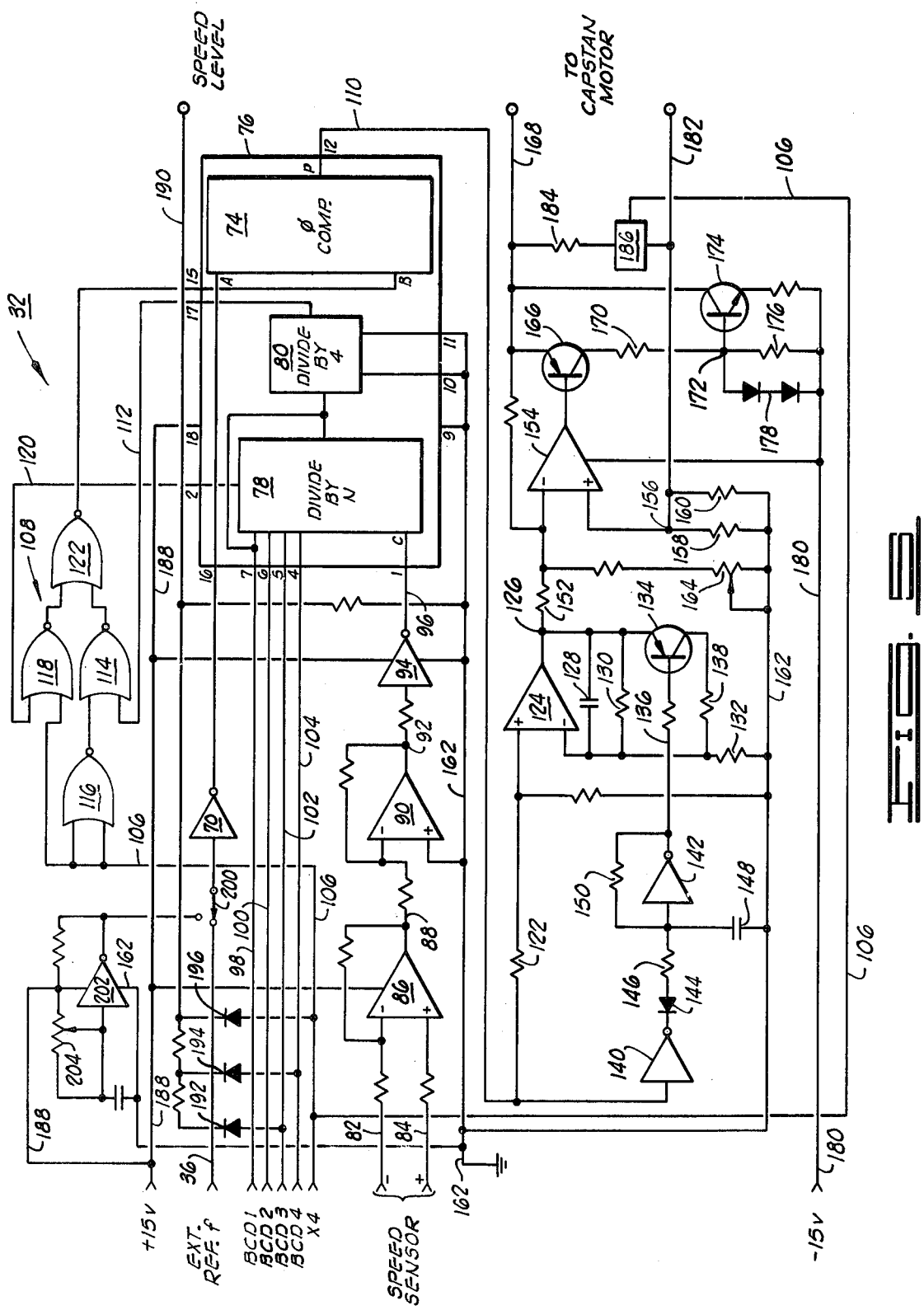

SYNCHRONOUS CAPSTAN DRIVE SYSTEM

BACKGROUND OF THE INVENTION

1. Field of the Invention

The invention relates generally to tape drive for tape transducer assemblies and, more particularly, but not by way of limitation, it relates to improvements in speed control and regulation of capstan drive motors.

2. Description of the Prior Art

The prior art includes numerous types of drive circuit and assembly which have been used for tape movement in tape transducer assemblies. Such prior approaches to tape drive have utilized both AC and DC types of motor, and each has its inherent advantages and disadvantages. Synchronous AC motor drive systems can provide the required constancy of speed, but these are subject to the limitations of fixed mechanical ratios that usually determine an exact speed. While such AC systems are relatively immune to drift caused by voltage, temperature and load parameters, slippage due to belts or friction components often attribute variables. Utilization of an AC motor drive system also severely limits the ability to select different speeds, and the inherent nature of the synchronous motor makes continuously variable systems impractical.

Direct current motors require a regulatory system employing some form of feedback, and either voltage or current feedback systems may adequately control tape speed if the load is constant. However, variable loading will cause fluctuations, a period of which is complicated by the time constant of an attendant regulator circuit. Phase locked loop systems for DC motor speed control help to overcome many of the problems of DC regulation and provide more precise and convenient selection of speed. Some such systems achieve the effect of an AC synchronous motor, but do not drive the motor directly with the reference frequency, relying instead upon indirect means or synchronization. The loop configuration generally does not include more than the motor itself, and thereby neglects other aspects of the drive system such as belts, pulleys and other mechanical parameters.

SUMMARY OF THE INVENTION

The present invention contemplates a variable speed tape drive system wherein the capstan drive motor provides a direct sense output which serves as a precise rotational reference pulse. A programmable counter and phase comparator then serve to shape reference frequency pulses with a pulse width indicative of the time difference between the reference frequency and the sense output signal. The output from the phase comparator is then fed to a DC amplifier which, in turn, provides drive energization to the capstan motor.

Therefore, it is an object of the present invention to provide a record tape drive system that is immune to drift with temperature, voltage, load, and mechanical slippage.

It is also an object of the invention to provide a variable speed tape drive system having the advantages of lower component cost, economy of power consumption and increased speed range.

It is yet another object of the invention to provide a variable speed record tape drive system which has controllability over a wider speed range with greater accuracy and greater speed of adjustment.

It is still another object of the invention to provide a tape drive system that has minimal inertia and can be varied between precise speeds over a wide range with fast response.

Finally, it is an object of this invention to provide a variable speed tape drive system which functions with the conventionally employed low cost DC motors, yet has the capability of maintaining precise tape speed control over a widely variable range.

Other objects and advantages of the invention will be evident from the following detailed description when read in conjunction with the accompanying drawings which illustrate the invention.

BRIEF DESCRIPTION OF THE DRAWINGS

FIG. 1 is a block diagram of a variable tape drive system as constructed in accordance with the present invention;

FIG. 2 is a view in elevation of a tape drive motor including rotational sense output structure;

FIG. 3 is a bottom view of the tape drive motor as shown in FIG. 2;

FIG. 4 is a bottom view of an alternative form of tape drive system wherein the tape drive motor is indirectly applied to provide capstan drive rotation; and FIG. 5 is a schematic diagram of a control circuit as constructed in accordance with the present invention.

DETAILED DESCRIPTION OF THE INVENTION

Referring to FIG. 1, the variable speed tape drive system of the present invention may be employed with any form of record playback or recorder system, but it has been particularly adapted for use with record tapes of the reel-to-reel type, viz., standard 0.150 inch cassettes. The tape transducer will employ some form of supply drive 10 providing drive to a tape supply reel 12 which moves record tape 14 across a control or transducing area, indicated generally as 16. The record tape 14 is then wound on a take up reel 18 under controlled movement by a rotational drive input from a take up power source 20. Supply drive 10 and take up drive 20 may be powered by individual motors or, as is true in many instances, a single central source provides drive power to all of the supply reel, take up reel and capstan drive. In the present embodiment, record tape 14 is moved at a selected speed by a drive capstan and idler (not specifically shown) indicated by dashed line 22 from capstan drive motor 24. This is a well known form of tape drive system and particulars of such are more specifically disclosed in U.S. Pat. No. 3,879,756 as issued on Apr. 22, 1975, in the name of DeBell et al.

The capstan drive motor 24 is adapted to include a rotationally connected tone wheel 26 which, in turn, is sensed by a speed sensor 28 to produce a rotational reference frequency output signal via lead 30 to a control circuit 32. A reference frequency generator 34 is used to produce a reference frequency signal via lead 36 to control circuit 32, and the reference frequency is selected to be of some constant value consonant with rotational speed sensor input and the desired limits of tape speed variation, as will be further described below. A control bit generator 38 then provides on-off binary bit input on selected ones of leads 40 which supply control bits 1 through 5. The control circuit 32 then functions in accordance with control bit input to develop a drive output voltage on lead 42 for energization of the capstan drive motor 24 at the proper selected speed and, therefore, the proper speed of record tape 14.

FIGS. 2 and 3 illustrate one form of capstan drive motor 24 as utilized in the direct drive system. Motor 24, e.g., a Microswitch Type 128EM21, is constructed with a three millimeter rotor shaft 44 which serves as the capstan when the motor 24 is mounted by means of its upper cylindrical surface 46 and suitable fastening to the underside of the transducer chassis. An opposite end 48 of the rotor shaft is then brought out for secure affixure to a tone wheel 26. Thus, tone wheel 26 and capstan 44 rotate in synchronism. The tone wheel 26 is formed from a suitably permeable metal and, in present design, it is formed as a gear with 48 gear teeth around the circumfery so that a magnetic sensor 50 secured in juxtaposition will provide an AC output via lead pair 30. Speed sensors such as the magnetic sensor 50 are well-known and commercially available, e.g., one form which may be used is the type VR250-100ST which is available from Transducer Systems, Inc. of Willow Grove, Pennsylvania. Such magnetic sensors are affected by the varying permeability of tone wheel 26 in proximity thereto, and provide a synchronous alternating signal of 48 cycles per tone wheel revolution. It should be understood too that the number of gear teeth on tone wheel 26 as well as the selected reference frequency input from generator 34 may be varied to achieve particular ranges of speed variation.

FIG. 4 shows an indirect drive system which functions in like manner to the direct drive of FIGS. 2 and 3. In this case a motor 52 may be a Matsushita Type MH1-5L6C DC motor with a 0.825 inch pulley 54 driving a capstan pulley 56 by means of a drive belt 58. The capstan pulley 56 would be affixed to drive a chassis-mounted capstan assembly (not shown) while also carrying a tone wheel 60 as affixed to capstan drive shaft 62. The tone wheel 60 is designed to carry 71 teeth which then interact with a magnetic sensor 50 to provide the proper alternating current signal output on lead 30 for input to control circuit 32 (FIG. 1).

FIG. 5 illustrates the control circuit 32 in greater detail. The reference frequency input is applied via lead 36 to a Schmitt trigger 70 with the output applied via lead 72 to the A input of a phase comparator 74. The phase comparator 74 is one part of an integrated circuit 76 which also includes a programmable counter consisting of a divide by N counter 78 and a divide by 4 counter 80, such integrated circuit being a Motorola Type MC14567BCP. The speed sensor inputs on leads 30 accept the low level output of the magnetic sensor 50, and this signal is applied by leads 82 and 84 to the respective inverting and non-inverting inputs of an operational amplifier 86, with output on lead 88 applied to the negative input of operational amplifier 90 for still further amplification and output at a junction 92. The combined amplification through op-amps 86 and 90 is to overdrive and produce a square wave at junction 92 which is then applied to a Schmitt trigger 94. The output of Schmitt trigger 94 then provides a pulse input via lead 96 to the C input of divide by N counter 78 on integrated circuit 76.

The count ratio of counter 78 is determined by five control bit inputs as applied on leads 98, 100, 102, 104 and 106. A division ratio of one is established by a logic HIGH on control bit line 98, and any division ratio from 1 through 60 may be established by proper binary coded decimal input on the control bit lines 98-106. The number 5 bit as applied on control bit line 106 is a times 4 multiplier bit which allows a fixed multiplication of the code set up on the remaining control bit lines 98-104. In present design, the reference frequency signal on lead 36 and the control bit impulse on leads 98-106 are 15 volt logic levels; however, level conversion buffers may be employed to allow operation from 5 volt logic level signals in the interest of circuit exigencies. While any of various binary input or switching arrangements may be utilized as control bit generator 38, a present embodiment utilizes a manual switch, a 5-Gang DIP-type switch.

The output from programmable counter 78 is then connected to the input of divide by 4 counter 80 with subsequent output through logic network 108 to input B of the phase comparator section 74, a logic type leading edge comparator. A HIGH level on input A will cause the output at terminal PC and lead 110 to go HIGH and remain HIGH until a HIGH transition appears at input B. Upon appearance of the transition HIGH at input B, the comparator output at terminal PC will go LOW until the next positive transition of the reference frequency appears at input A. In this manner the phase comparator 74 produces a pulse output HIGH of a duration indicative of the time difference between its two inputs at terminals A and B.

Output from counter 80 via lead 112 (IC No. 17) is applied to a NOR gate 114 along with output from NOR gate 116 as controlled by the times four multiplier input on lead 106. The lead 106 is also connected to NOR gate 118 along with enabling connector 120 from counter 78 (IC No. 2). Output indication from gates 114 and 118 are then applied in parallel to NOR gate 122 providing output to the B input (IC No. 15) of IC phase comparator 74.

The phase compared output on lead 110 is then applied via a resistor 122 to the positive input of a DC amplifier/integrator 124 to produce an output at junction 126 which contains both the input pulse and a DC level which is proportional to the input pulse time duration. This DC level is developed by the charge across capacitor 128 which shunts a feedback resistor 130. The resistor 130 and a resistor 132 coact to determine the gain of DC amplifier/integrator 124 which is set to approximately unity. As the repetition rate of the reference frequency is constant, and hence determines the comparator output repetition rate when the system is in synchronism, the charge across capacitor 128 remains practically constant between pulses since its discharge time through resistor 130 is very long compared to the pulse repetition rate. A PNP transistor 134 is connected common emitter between junction point 126 and resistor 132 to receive base input via a lead 136. The transistor 134 may be such as a type MPSA 66, a well-known Darlington configuration, and it serves the function of discharging capacitor 128 through a resistor 138 only in the event of a change in the repetition rate towards a much longer interval (as would occur on a selected speed reduction), otherwise transistor 134 is cut-off during normal operation and has no effect upon circuit operation.

Base input control of transistor 134 is accomplished by a series of Schmitt triggers 140 and 142. Thus, phase comparator output on lead 110 is also applied to the input of Schmitt trigger 140 with its output applied through a diode 144 and series-connected resistor 146 to the input of Schmitt trigger 142. The Schmitt trigger 142 functions as an inhibited square wave generator with a period somewhat longer than the normal pulse repetition rate as determined by the reference frequency. Schmitt trigger 142 is an inverting type whose output will be HIGH until its input goes sufficiently HIGH to cause triggering action. The Schmitt trigger 140 prevents the input of Schmitt trigger 142 from going HIGH by shunting it to ground through resistor 146 and diode 144 at the normal repetitive intervals as determined by the reference frequency. This action then prevents the charge across capacitor 148 from reaching a level sufficient to cause the output of Schmitt trigger 142 to go LOW and turn on transistor 134, except in the event of a repetition rate change towards much longer interval. Thus, in the event that the pulse repetition rate should become longer than the time interval as determined by feedback resistor 150 and capacitor 148, the Schmitt trigger 142 will trigger and cause transistor 134 to conduct and discharge capacitor 128. When capacitor 128 discharges, the DC level in the output of DC amplifier/integrator 124 will return to almost zero. Then, with no DC component present in the input to the capstan motor 24, the motor will rapidly decelerate.

Motor control output at junction 126 is supplied through a resistor 152 to the negative input of an integrated circuit DC amplifier 154, the positive input of which is connected to a junction 156 and parallel resistors 158 and 160 to ground lead 162. A voltage divider including potentiometer 164 connected between ground lead 162 and negative input to DC amplifier 154 provides initial drive tracking calibration. The output of amplifier 154 is applied to the base of transistor 166, a PNP type 2N4402, that is connected common emitter to capstan motor drive lead 168 while the collector is connected through a resistor 170 to junction 172 at the base input to transistor 174, an NPN type 2N4922. The base junction 172 is further connected via a resistor 176 and parallel-connected series diodes 178 to the negative 15 volt supply lead 180 from the primary power source. The non-inverting input of amplifier 154, i.e., junction point 156, is connected to provide the positive capstan motor drive on lead 182. A high wattage resistance 184 is connected between capstan motor output drive leads 168 and 182 to provide dynamic braking of the capstan motor upon down speed changes, and a series-connected normal-closed relay 186 may optionally be included to enable certain other operational characteristics, as will be further described below.

Positive 15 volt supply input is applied on lead 188 for application as required throughout the control circuit 32. Speed level control indication for usage on front panel indicators and the like is output on a lead 190 in response to actuation of control bits 3, 4 and 5. That is, with control bit actuation on one of control bit leads 102, 104 or 106, signal indication is provided through respective ones of diodes 192, 194 and 196 to the speed level output lead 190. The normal-closed relay 186 may be optionally included to enable certain performance characteristics, to be described, and such relay 186 should be selected to energize open in response to presence of a HIGH voltage level on control bit 5 lead 106, the times four multiplier indication.

External reference frequency can be utilized as input on line 36, but a two-position switch 200 may be actuated to provide internal reference frequency from an oscillator 202. Oscillator 202 is a standard form of integrated circuit oscillator which is adjustable between 150 and 300 Hz. by means of potentiometer 204 in the feedback circuit.

The oscillator 204 is presently made up of a section of integrated circuit module, a quad Schmitt trigger type MC14584BCP. Also, the Schmitt trigger circuits 70, 94, 140 and 142 are constituted in present design of a single integrated circuit, a quad Schmitt trigger type MC14584BCP. The amplifiers 86, 90, 124 and 154 may be constructed utilizing a single integrated circuit of Type MC4741CP. NOR gates 114, 116, 118 and 122 may be IC Type MC14001BCP. It should be well understood, however, that selection of the particular types of individual stages and integrated circuit components is well within the choice of the circuit user.

In operation, the present variable speed tape drive system is a truly synchronous system which is immune to drift with temperature, voltage, load, and mechanical slippage. This system maintains independence of pulley ratios since the capstan rotation is precisely sensed and is totally synchronous with the reference frequency. Precise discrete speeds may be selected by the digital control bit inputs, with selection over a wide range, and continuously variable control is readily obtained by variation of the reference frequency. In present design, the reference frequency is selected to be 240 Hz. and this can control a speed range of up to 32 to 1; but, it should be understood that variation of the reference frequency may satisfy certain additional requirements, e.g., with a reference frequency of 150 Hz. the speed range can be varied from 48 to 1.

The tone wheel as read by magnetic sensor 28 provides precise rotational reference pulses, and the tone wheel signal and the 240 Hz. reference signal are both converted to positive square waves by Schmitt triggers. Programmable counters 78 and 80 and phase comparator 74 are then used to provide 240 Hz. uni-directional pulses having a pulse width which is indicative of the time difference between the 240 Hz. reference pulse and the tone wheel output. The pulse output from phase comparator 74 on lead 110 is then fed to a DC amplifier to drive the capstan motor via output on leads 168 and 182 (lead group 42). The DC amplifier/integrator 124 partially integrates the pulses to provide a basic DC component in the output which is proportional to the speed-determined width of the pulses. The resultant drive voltage is a flat DC level with 240 Hz. positive pulses superimposed thereon.

The pulse height, width and the DC level assume different relative proportions for each speed as determined by division of the tone wheel repetition rate in the programmable counter 78. The DC voltage level determines the gross speed, while the pulses maintain synchronization. In essence, the 240 Hz. reference pulses drive capstan motor 24 in concert with a DC level that is determined by the pulse width obtained by phase comparison with the speed-generated signal from speed sensor 28 (magnetic sensors 50). The system seeks to run at a speed that results in a constant and even repetition rate of the tone wheel signal, and since this cannot be achieved until it is in synchronization with the reference frequency, it cannot lock on any other frequency.

The phase comparator 74 is a logic type leading edge comparator such that the 240 Hz. reference frequency leading edge turns the comparator output on, and the leading edge of the tone wheel pulse turns it off. Thus, the output of comparator 74 will have a saturated HIGH logic level until it is turned off by a pulse from the tone wheel speed sensor 28. In the absence of a speed sensor output signal it will remain HIGH indefinitely, causing the motor to reach maximum speed. Conversely, if the tone wheel speed sensor output signal is a much higher frequency than the 240 Hz. reference frequency, the output of phase comparator 74 will go LOW and remain that way until the tone wheel signal frequency drops below 240 Hz., thus causing the motor to slow down, or even to stop if there is no 240 Hz. reference signal present. In this manner, the system is able to track properly in direction of speed adjustment.

The actual speed is determined by the programmable counters 78 and 80, the division ratio of which is set by the 5 control bit digital input lines 98–106. If the division ratio is increased by a factor of 2, the motor must run twice as fast to produce pulses at the 240 Hz. reference frequency rate. The number of teeth on the tone wheel 26, the division ratio of counters 78 and 80, and the reference frequency are the only factors than can affect the accuracy of capstan speed, provided that the speed to be selected is within the capabilities of the motor.

When using the direct capstan system as illustrated in FIGS. 2 and 3, and a selected reference frequency of 242.57 Hz., five control bit speed selection will enable the following:

| BCD INPUT | SPEED SELECTED WITHOUT 5th BIT IPS | SPEED SELECTED WITH 5th BIT IPS |
|---|---|---|
| 1 | 1.875 | 7.500 |
| 2 | 3.750 | 15.000 |
| 3 | 5.625 | 22.500 |
| 4 | 7.500 | 30.000 |
| 5 | 9.375 | 37.500 |
| 6 | 11.250 | 45.000 |
| 7 | 13.125 | 52.500 |
| 8 | 15.000 | 60.000 |
| 9 | 16.875 | |
| 10 | 18.750 | |
| 11 | 20.625 | |
| 12 | 22.500 | |
| 13 | 24.375 | |
| 14 | 26.250 | |
| 15 | 28.125 | |

In an alternative form of the indirect capstan system as illustrated in FIG. 4, with a 240.76 Hz. reference frequency, four control bit speed selection enables the following:

| BCD INPUT | SPEED SELECTED |
|---|---|
| 1 | 1.00 ips |
| 2 | 2.00 ips |
| 3 | 3.00 ips |
| 4 | 4.00 ips |
| 5 | 5.00 ips |
| 6 | 6.00 ips |
| 7 | 7.00 ips |
| 8 | 8.00 ips |
| 9 | 9.00 ips |
| 10 | 10.00 ips |
| 11 | 11.00 ips |
| 12 | 12.00 ips |
| 13 | 13.00 ips |
| 14 | 14.00 ips |
| 15 | 15.00 ips |
| 16 | 16.00 ips |

Thus, any desired tape speed range between wide limits may be provided by specific selection of reference frequency, tone wheel output pulses per revolution and/or the binary coded decimal control input to counter 78. In the present embodiment as described heretofore, the parameters adhere to the speed calculation formula:

$$\text{Tape Speed } (IPS) = \frac{\text{Reference Frequency}}{48 \div BCD} (.37102208)$$

where the multiplier 0.37102208 is equal to tape movement per capstan revolution.

The circuit comprised of amplifier 154, transistor 166 and transistor 174 forms a DC power amplifier to drive the capstan motor 24 in response to input as developed at junction point 126. This reactive triad constitutes a linear amplifier whose output is zero when the input is zero. The amplifier presents the pulses and associated DC level to the motor via capstan motor leads 168 and 182, and the DC level establishes gross speed, while the pulses maintain synchronization. The pulse height, width and DC level assume different relative proportions for each speed. The period of drive power to the capstan drive motor 24 is always that of the reference frequency, regardless of the speed.

Motor current sampling is employed to improve stability and linearity of the DC power amplifier and to help maintain a linear rpm per volt relationship regardless of load. This is achieved by the small voltage drop across parallel resistors 158 and 160 connected to the non-inverting input of amplifier 154. Thus, increased loading of the capstan motor 24 will result in increased power applied thereto in order to offset errors produced by the loading. While this action is not vital to the system operation, since the speed sensor also causes compensatory action, the net effect is greater stability. To reduce system inertia still further, resistor 184 shunts the motor 24 to provide dynamic braking action. This reduces the tendency of overshoot between pulses and provides faster speed reducing times. At maximum speed the resistor 184 consumes more current than the motor 24, and in the event that it may desirably be eliminated, it may be done by interconnecting a command from control bit 5 lead 106 to normal-closed relay 186. This option serves to reduce the power required and to increase the reserve necessary to maintain synchronization if the maximum speed of 60 inches per second is used.

The foregoing discloses a novel variable speed record tape drive system that is a precisely synchronous system having very low inertia. The system is immune to drift of temperature, voltage, load and mechanical slippage, and it is independent of pulley ratios since the capstan rotation is precisely sensed and is totally synchronous with the applied reference frequency. While the foregoing description has been primarily directed to record tape transport apparatus of the well-known cassette type utilizing conventional 0.150 inch tape cassettes, it should be well understood that the similar type of drive system can be effectively employed with any reel-to-reel recorder system.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for variable speed control of record tape moved by an electric motor driving a capstan, comprising:
    means for generating a reference frequency signal;

means sensing capstan rotation to generate a pre-set number of rotation pulses per capstan revolution;

means for dividing said rotation pulses at a selected division ratio to provide a divided pulse output;

means for comparing the phase of said reference frequency signal and said divided pulse output to generate a speed variation signal having pulse width indicative of error time difference; and means amplifying and partially integrating said speed variation signal to produce a drive output consisting of drive frequency pulses superimposed on a controlled DC level that is varied in proportion to pulse width of said speed variation signal, thereby to energize the motor driving said capstan.

2. Apparatus as set forth in claim 1 wherein said means sensing capstan rotation comprises:

tone wheel means connected for synchronous rotation with the capstan and having a plurality of indicators disposed equispaced around the periphery; and means sensing each of said indicators to generate said rotation pulses.

3. Apparatus as set forth in claim 1 wherein said means for dividing comprises:

selector means generating a selected binary coded decimal signal combination; and programmable counter means receiving said rotation pulses and said signal combination to provide said divided pulse output.

4. Apparatus as set forth in claim 2 wherein said means for dividing comprises:

selector means generating a selected binary coded decimal signal combination; and programmable counter means receiving said rotation pulses and said signal combination to provide said divided pulse output.

5. Apparatus as set forth in claim 1 wherein said means amplifying and integrating includes:

operational amplifier means receiving as input said speed variation signal, said amplifier means operating at unit gain and including integrating feedback means which enables said drive pulse output with controlled DC level.

6. Apparatus as set forth in claim 2 which is further characterized in that:

said reference frequency is approximately 240 Hz. and said tone wheel means includes 48 indicators.

7. Apparatus as set forth in claim 3 which is further characterized in that:

said selector means provides a different binary coded decimal signal combination for selected division ratios from one to fifteen.

8. Apparatus as set forth in claim 7 wherein:

said selected division ratios enable incremental tape speed changes from approximately 1.875 inches to 28 inches per second.

9. Apparatus as set forth in claim 7 which is further characterized to include:

a binary coded decimal multiple times four input from said selector means to said programmable counter to extend the variable tape speed range to approximately 60 inches per second.

10. Apparatus as set forth in claim 1 wherein said means for comparing comprises:

phase comparator means receiving said reference frequency signal and said divided pulse output at respective first and second inputs and generating a speed variation pulse output at said reference frequency with pulse width indicative of phase difference.

11. Apparatus as set forth in claim 1 wherein said means amplifying and partially integrating comprises:

amplifier means receiving said speed variation signal and generating a pulse output signal;

capacitor feedback means connected between output and input of said amplifier means to adjust the DC level of said pulse output signal; and DC power amplifier means receiving said pulse output signal and generating said drive pulse output to energize said motor.

12. Apparatus as set forth in claim 10 wherein said means amplifying and partially integrating comprises:

amplifier means receiving said speed variation signal and generating a pulse output signal;

capacitor feedback means connected between output and input of said amplifier means to adjust the DC level of said pulse output signal; and DC power amplifier means receiving said pulse output signal and generating said drive pulse output to energize said motor.

13. Apparatus as set forth in claim 4 wherein said means for comparing comprises:

phase comparator means receiving said reference frequency signal and said divided pulse output at respective first and second inputs and generating a speed variation pulse output at said reference frequency with pulse width indicative of phase difference.

14. Apparatus as set forth in claim 13 which is further characterized in that:

said selector means provides a different binary coded decimal signal combination for selected division ratios from one to fifteen.

15. A method for synchronous drive control of record tape, comprising:

generating a predetermined reference frequency signal;

generating a sense signal indicative of record tape speed;

comparing the phase of said reference frequency signal and said sense signal to generate a pulse output at said reference frequency wherein pulse width is indicative of variance from synchronization; and partially integrating said pulse output to develop a drive pulse output having pulses at said reference frequency superimposed on a DC level that varies proportional to record tape speed error to maintain said reference frequency signal and said sense signal in synchronism.

16. A method for synchronous drive control as set forth in claim 15 which further includes the step of:

varying the speed of said record tape by dividing said sense signal in accordance with a selected division ratio.

17. A method for synchronous drive control as set forth in claim 16 which further includes the step of:

providing a preselected plurality of sense signal division ratios for selective control of the record tape speed over a range of discrete tape speeds.

* * * * *